United States Patent [19]

Gorshe

[11] Patent Number: 4,757,499
[45] Date of Patent: Jul. 12, 1988

[54] METHOD FOR ZERO BYTE TIME SLOT INTERCHANGE

[75] Inventor: Steve S. Gorshe, Glendale, Ariz.

[73] Assignee: GTE Communication Systems Corporation, Phoenix, Ariz.

[21] Appl. No.: 944,134

[22] Filed: Dec. 22, 1986

[51] Int. Cl.$^4$ .............................. H04J 3/00; H04J 3/12
[52] U.S. Cl. .................................... 370/99; 370/110.1
[58] Field of Search ............... 370/68, 99, 110.1, 68.1, 370/100; 379/65, 93, 94

[56] References Cited

U.S. PATENT DOCUMENTS

| | | | |
|---|---|---|---|
| 4,254,461 | 3/1981 | Chemla et al. | 364/200 |
| 4,394,759 | 7/1983 | Delle Donne | 370/110.1 |
| 4,685,100 | 8/1987 | Coppers et al. | 370/110.1 |

Primary Examiner—Douglas W. Olms
Assistant Examiner—Frank M. Scutch, III
Attorney, Agent, or Firm—Frank J. Bogacz; Peter Xiahros

[57] ABSTRACT

This method is a scheme for suppressing excessive amounts of logic zeros transmitted via T-carrier line facilities between switching systems or channel banks. This scheme provides proper zero bit suppression for alternating mark inversion signalling (AMI). A proper AMI signal contains no more than 15 consecutive logic zero bit positions. This scheme provides for encoding and decoding a 4 frame octet group of an extended superframe. Logic ones are introduced into octets which would otherwise violate the AMI signalling rules. These logic ones are then removed by the receiving system and replaced with the indicated all zero octets before being given to down stream processing. Intermediate storage octets are utilized to contain addresses of an all zero octet. This scheme provides for minimal buffering at the encoding system, which facilitates error detection and correction by the decoding system.

30 Claims, 6 Drawing Sheets

METHOD FOR ZERO BYTE TIME SLOT INTERCHANGE

CROSS REFERENCE TO RELATED APPLICATIONS

The present application is related to co-pending applications U.S. Ser. Nos. 867,038 and 867,039, having the same inventive entity and being assigned to the same assignee as the present application.

BACKGROUND OF THE INVENTION

The present invention pertains to data transfer between switching and transmission systems and more particularly to a line format for zero byte time slot interchange which satisfies T1 line zero suppression requirements.

T1 transmission line facilities operate at 1.544M bits per second. The T1 line transmission facilities utilize an alternating mark inversion (AMI) signaling scheme. This AMI signal contains no more than 15 consecutive zero bit positions in a particular T1 bit stream. This requirement of not more than 15 zero bits in a string derives from the operation of repeaters in T1 transmission line systems. Commonly used repeaters may not operate within specification if more than 15 consecutive zeroes are transmitted. Repeater synchronization cannot be guaranteed for bit streams with more than 15 consecutive zeroes.

One technique used for T1 line 0 bits suppression is bipolar with 8 zeroes substitution (B8ZS). The B8ZS technique utilizes two special coding patterns containing bipolar violations which are substituted for strings of 8 zeroes in the input signal stream. Upon detecting bipolar violations with either of the two special patterns, the receiver places 8-bits of zeroes in the corresponding positions in the output bit stream.

One technical disadvantage of the B8ZS technique is that it violates the AMI signaling standard on T1 lines. Since bipolar violations normally indicate transmission errors, the deliberate introduction of these transmission errors by B8ZS signaling reduces the effectiveness of determining real errors which are detected by the AMI signaling scheme. Another disadvantage of the B8ZS technique is that it detects strings of 8 zeroes and substitutes the special violation patterns more frequently than the specified T1 line operation requires. In addition to these disadvantages, the B8ZS patterns will not propagate through standard multiplexer derived DS1 facilities or protected T1 facilities.

Severe economic disadvantages obtain for the introduction of the B8ZS technique into the North American transmission network. This introduction would require a global replacement of existing multiplexers, automatic protection switches, electronic cross-connect devices (DACS), digital switch interface hardware and any other item in the network with violation monitor and removal (VMR). Such an introduction of the B8ZS technique presents an unreasonably large capital investment requirement to change network hardware.

SUMMARY OF THE INVENTION

A data transmission system includes first and second digital switching systems. These switching systems are connected via T-carrier line facilities for the bidirectional transmission of data. Each of the switching systems includes a method for Zero Byte Time Slot Interchange (ZBTSI).

First, the Zero Byte Time Slot Interchange method determines whether there is only one all zero octet in a number of frames of data. If there is, it is located and the address of this all zero octet is saved in a predetermined location. Further, the all zero octet is given non-zero contents.

Next, the method determines whether there are multiple all zero octets in the frames. If there are, certain intermediate storage octets are also tested for a non-zero conditions. If these intermediate storage octets are non-zero, the frame in which these octets reside is located. A non-zero contents is stored in the all zero octet. Then, a chaining procedure places an address of the last all zero octet in the contents of the next all zero octet. The steps of storing and chaining are repeated for each of the frames of data.

If certain of the intermediate storage octets are an all zero octet, the address of a particular intermediate storage octet is stored in the previous all zero octet. Then, a chaining procedure links the particular intermediate storage octet to the previous all zero octet by placing an address into the intermediate storage octet. Lastly, this storing and chaining is iterated for each of the frames.

DESCRIPTION OF THE PREFERRED EMBODIMENT

Figure 1:
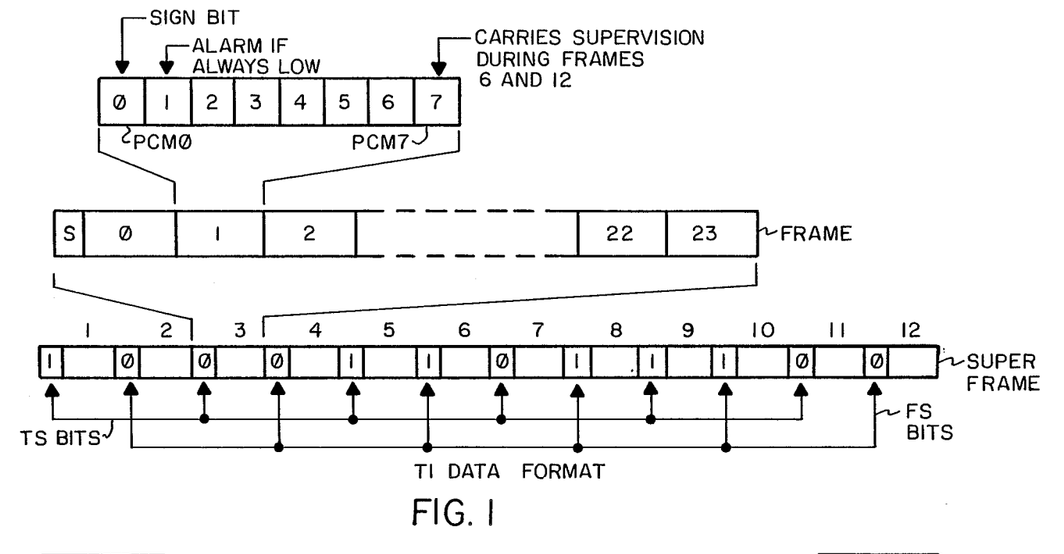
FIG. 1 is a layout diagram of typical T1 frame data format.

The structure of the T1 line format is based on the standard 1.544M bits per second DS1 digital signal format. This structure is shown in FIG. 1. The DS1 frame contains 193 bits of information. This information is organized into a single bit of synchronization or framing data plus 192 bits of payload data. The 192 bits of payload data are organized into 24 channels, each channel containing 8-bits and can be referred to as an octet.

In the DS1 signaling, the least significant bit, PCM 7, of each octet in every sixth frame is commonly used as a robbed or stolen signaling bit to indicate the signaling states of the active channels. These signaling bits are transmitted at a rate of 24 bits per 6 frames or 4 bits per frame.

Each channel (octet) consists of eight bits, PCM0-PCM7. PCM0 is a sign bit. PCM1-PCM7 give the magnitude of the voice sample. PCM1 may also be used to convey alarm indications. PCM7 is used to carry supervision information during frames 6 and 12.

Twenty-four channels are organized together with an S bit to form a frame. Each voice sample in the frame is associated with one channel of voice (or data). The channels are numbered 0-23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Examination of FS bits is an analogous procedure to that of the TS bits, except for the fact that no check is made for FS bits occurring during frames 2 and 8.

Figure 2:
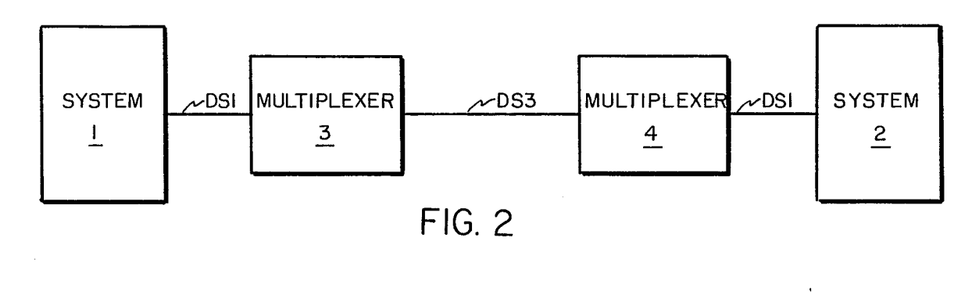
FIG. 2 is a block diagram of interconnected telecommunications systems.

In FIG. 2, system 1 is shown connected to system 2. System 1, which may comprise a telecommunication switching system or a channel bank, is shown connected to multiplexer 3. This connection is accomplished by a transmission line employing T1 or DS1 transmission. The transmission rate of a T1 or DS1 transmission line is 1.544 Megabits per second. Similarly, system 2 is shown connected via another DS1 transmission line to multiplexer 4. Multiplexers 3 and 4 may be connected via a high speed transmission line, such as a DS3 transmission line. The DS3 transmission line transmits data at approximately a 45 Megabit per second rate.

The standard superframe as shown in FIG. 1 contains 12 frames of information. For purposes of this method it is assumed that an extended superframe will be employed. This extended superframe includes 24 frames of information.

In order to provide multiplexers, such as multiplexers 3 and 4, and repeaters with the proper ones (logic 1s) density of data on the transmission line, the following requirement must be achieved. No more than 15 consecutive bits of zero may appear within a transmitted string of data.

The present zero byte time slot interchange (ZBTSI) method provides for flagging each group of 4 frames (or 96 octets) for violations of either of the above mentioned requirements. For example, if system 1 were transmitting information to system 2, the logic of system 1 would format a particular 4 frame group in the manner taught by this method. This 4 frame group of data would be transmitted via multiplexers 3 and 4 to system 2. Since multiplexers 3 and 4 and any intervening repeater circuitry (not shown) are standard commercially available equipment, the ZBTSI method would provide the proper ones density and inhibit the production of any zero octets which violate the consecutive zeros rule without altering any of the transmission equipment already in place. The newly formatted data would be transparent to all multiplexers and repeaters since it would have the proper ones density. Upon receipt of the 4 frames of information, system 2 would then buffer the 96 octets and according to the method reconstruct any all zero octets.

An octet which has all zeroes as its contents violates the above mentioned rule and is termed an all zero octet (AZO). The extended superframe consist of 24 frames. Within this superframe, the framing bits (TS or FS) of frames 4, 8, 12, 16 and 24 provide the framing pattern sequence. The framing bits of frames 2, 6, 10, 14, 18 and 22 provide the CRC6 code bits. The framing bits of frames 1, 5, 9, 13, 17 and 21 are used to provide the zero byte time slot interchange processing flags in accordance with this method.

These processing flag bits (framing bits) are set to a logic 1, if no zero byte time slot interchange processing was required during the 4 frame interval. Conversely, these processing flag bits are set to logic 0, if this method was employed in order to change any AZO data before transmission through the system.

This method of zero byte time slot interchange introduces 0.13 msec. delay at the encoding system and a 0.63 msec delay at the decoding system. In order for a given octet location to be marked by this method as an AZO, this octet must have been a zero octet. Buffering at the decoder provides a method in which error detection and correction is made easier than encoder type buffering.

Figure 3A:
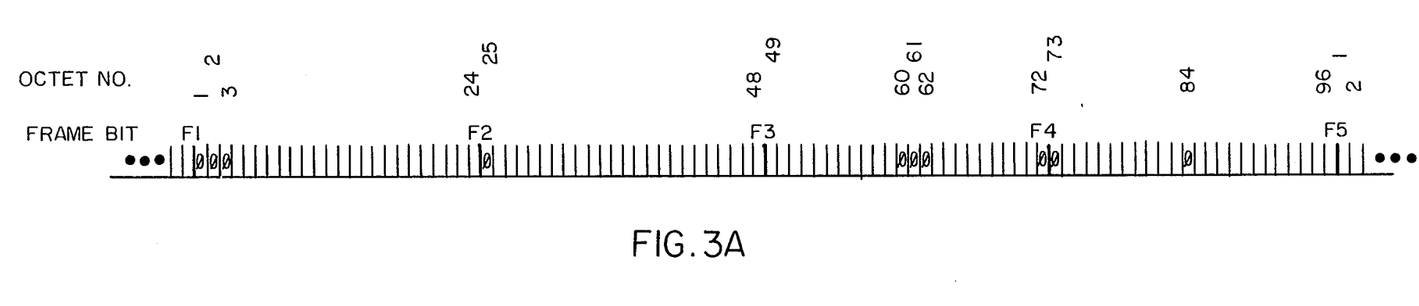
FIGS. 3A and 3B depict a 96 channel data stream before and after the zero byte time slot method is applied, respectively.
Figure 3B:
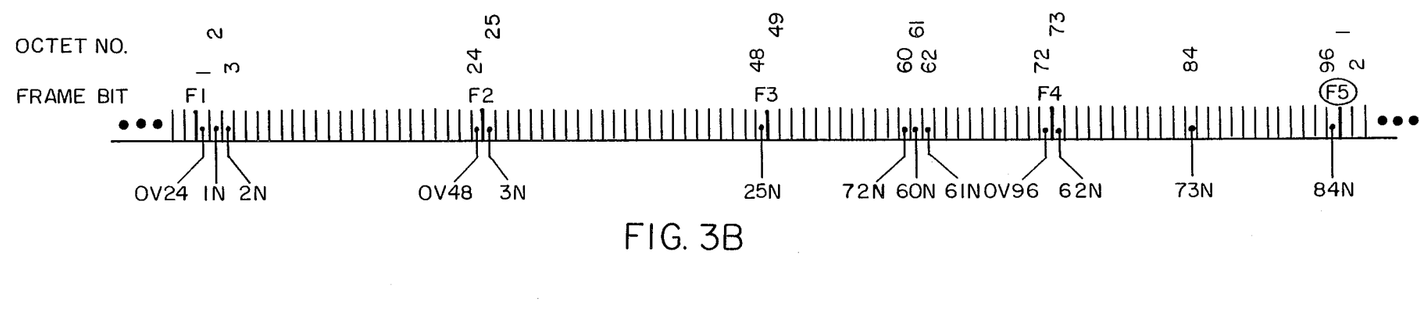

Now turning to FIGS. 3A and 3B, sample data strings are shown. FIG. 3A depicts a 4 frame group of octets as originally transmitted without the use of the zero byte time slot interchange method. This original data string includes several octets which are an AZOs. These octets are octet numbers 1, 2, 3, 25, 60, 61, 62, 72, 73 and 84. The octet numbers are shown and their respective contents are shown below, between the hash marks.

FIG. 3B depicts the 4 frame data string produced as a result of the application of the ZBTSI method to the original data stream of FIG. 3A.

In FIG. 3B, several notations and markings exist below the line representing the data bits. These markings indicate the following. The first set of markings are composed of a number followed by a Y or an N which point to the contents of a particular octet. The numeric part of this indicator is the address which is contained in the contents of the octet to which the indicator is pointing. This address is contained in PCM bits PCM7 through PCM1. The eighth bit or PCM0 indicates the last all zero octet indicator for the 4 frame group. The Y or N indicates whether the last all zero bit is set or not. A Y indicates the bit is set with a logic 1 and an N indicates it is reset with a logic 0.

The other indicator in FIG. 3B consists of an OV followed by a numeric designation. The OV indicates an octet value number which is contained in the location to which the indicator is pointing. For example in FIG. 3B, the OV24 indicates that octet 1 contains the octet value of octet 24. In addition, the framing bit F5 is circled. This indicates that there were all zero octets within the 4 frame group and that this framing bit is set as a flag to indicate this event.

The ZBTSI method is shown in FIGS. 4A through 4D. When the transmitting system has the 4 frame string of data as depicted in FIG. 3A, the logic of the system then perform the ZBTSI method by entering block 401. FIGS. 4A through 4D should be view together.

Figure 4A:
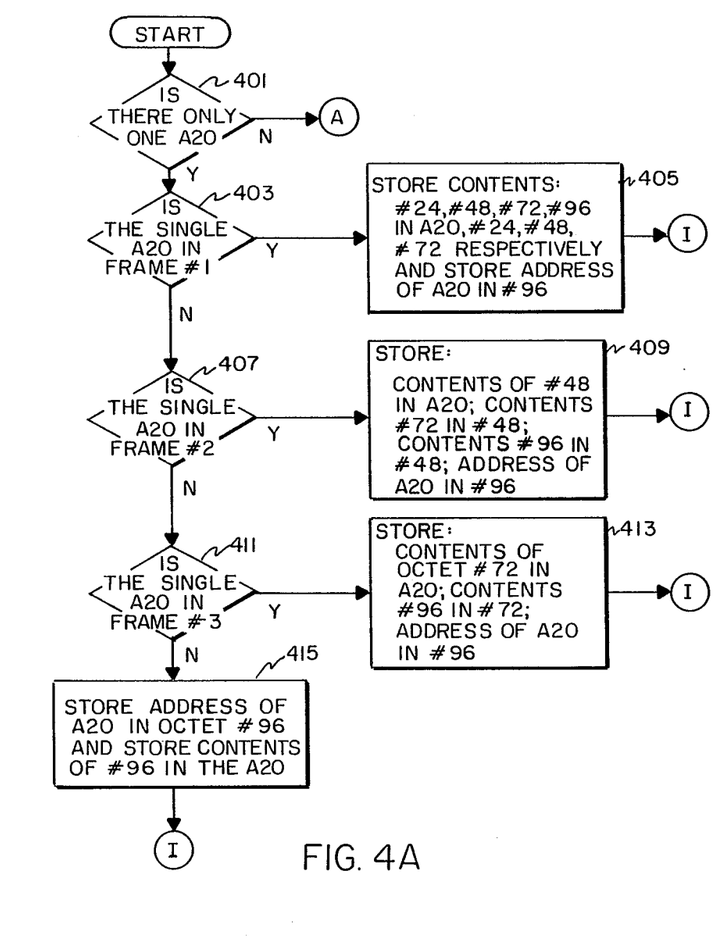
FIGS. 4A, 4B, 4C and 4D depict a logic diagram of the encoding method.

Block 401 determines whether there is only one all zero octet (AZO) within the 4 frame group shown in FIG. 3A. If there is more than one all zero octet in the 4 frame group, control will be transferred to block 417 via the N path. This is the case as shown in FIG. 3A.

If there is only one AZO in the 4 frame group, control is transferred to block 403 via the Y path. Block 403 determines whether the single all zero octet is in the first frame (octets 1 through 24). If the AZO is in the first frame of data, block 403 transfers control to block 405 via the Y path. Block 405 stores: the contents of octet number 24 into the all zero octet; the contents of octet number 48 into octet number 24; the contents of octet number 72 into the contents of octet number 48;

and the contents of octet number 96 into contents of octet number 72. Also, the address of this all zero octet is stored in the contents of octet number 96. Block 405 then transfers control to block 471, which transmits the data and ends the method.

If the single AZO was not in the first frame, block 403 will transfer control to block 407 via the N path. Block 407 determines whether the single AZO was in the second frame (octets 25 through 48). If the all zero octet is in the second frame, block 407 transfers control to block 409 via the Y path. Block 409 stores: the contents of octet number 48 in the location of the all zero octet; the contents of octet number 72 in octet number 48; the contents of octet number 96 in octet number 48. In addition, the address of the all zero octet is stored in octet number 96. Block 409 then transfers control to block 471.

If the single AZO was not in frame number 2, block 407 transfers control to block 411 via the N path. Block 411 determines whether the single all zero octet is in the third frame (octets 49 through 72). If the AZO was in the third frame, block 411 transfers control to block 413 via the Y path. Block 413 stores: the contents of octet number 72 in the all zero octet location; the contents of octet number 96 into octet number 72; and the address of the all zero octet in octet number 96. Block 413 then transfers control to block 471.

If the single all zero octet was not in frame 3, it must have been in frame 4. As a result, block 411 transfers control to block 415 via the N path. Block 415 stores the address of the all zero octet into octet number 96 and stores the contents of octet number 96 in the all zero octet location. Block 415 then transfers control to block 471.

Next, block 417 determines whether there are multiple all zero octets within the 4 frame group. If there are not, there are no all zero octets within the frames and the frames of data may be transmitted as is. Therefore, block 417 transfers control to block 471 via the N path.

Figure 4B:
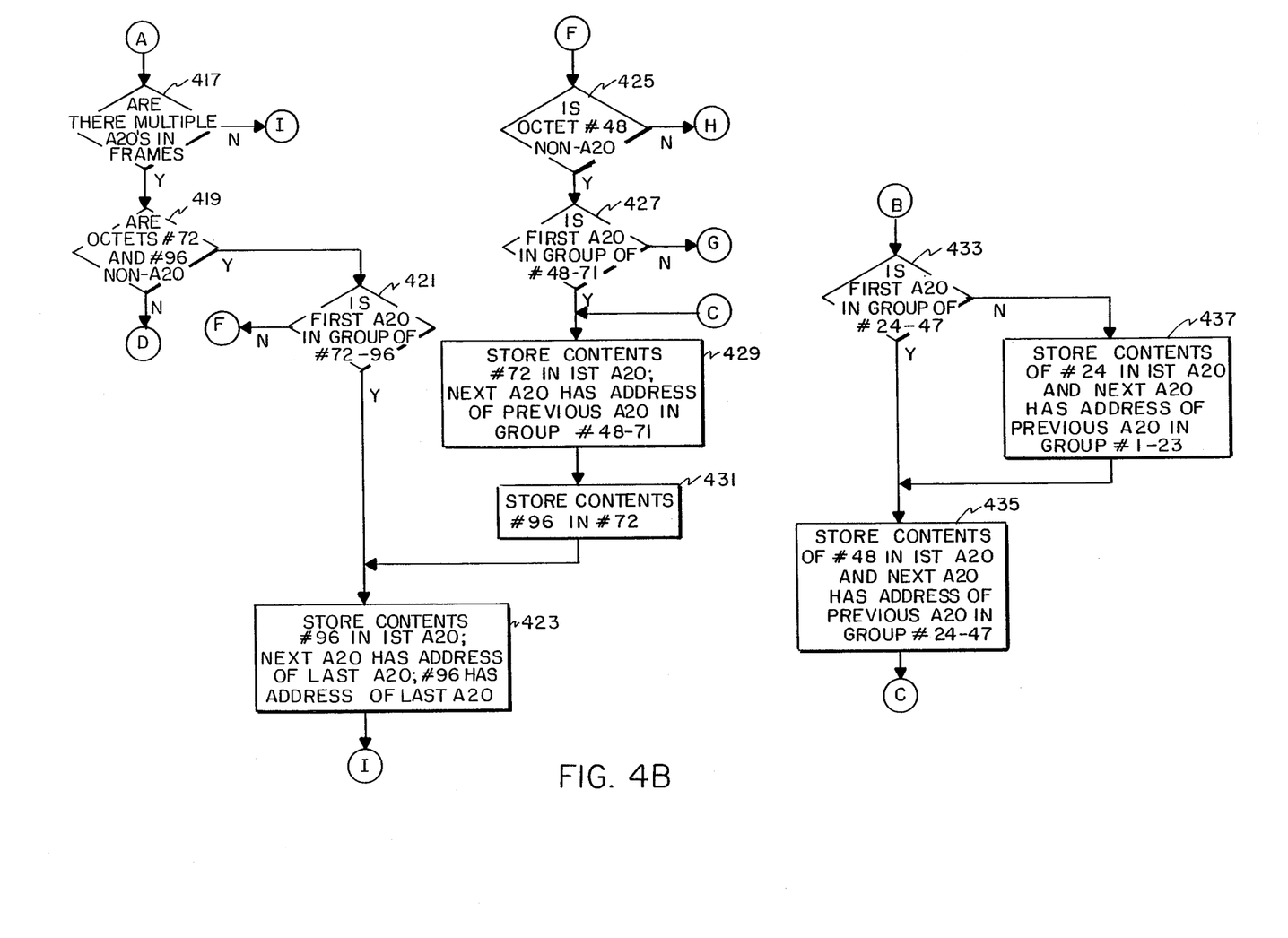

If there are multiple ZAOs in the 4 frame group, block 417 transfers control to block 419 via the Y path. Block 419 determines whether octets 72 and 96 are both non zero. If they are, block 419 transfers control to block 421 via the Y path. Block 421 determines whether the first AZO is in the group of octets 72 through 96. If it is, block 421 transfers control to block 423 via the Y path. Block 423 stores: the contents of octet number 96 in the first AZO; the next AZO in the the address of the last AZO stored in its contents; and the address of the last AZO stored in the contents of octet number 96. Block 423 then transfers control to block 471.

If the first AZO was not in the group of octets 72 through 96, block 421 transfers control to block 425 via the N path. Block 425 determines whether octet number 48 is a non-zero octet. If it is, block 425 transfers control to block 427 via the Y path. Block 427 determines whether the first all zero octet is the group of octets 48 through 71. If it is, block 427 transfers control to block 429. Block 429 stores the contents of octet number 72 into the first all zero octet. Next, each AZO has the address of the previous AZO stored in its contents. This occurs for the entire group of octets 48 through 71. Block 429 transfers control to block 431. Block 431 stores the contents of octet number 96 into octet number 72. Block 431 transfers control to block 423, which operates as mentioned above.

If the first AZO was not in the group of octets 48 through 71, control is transferred from block 427 to block 457 via the N path. Block 457 determines whether octet numbar 24 is a non-zero octet. If it is, block 457 transfers control to block 433 via the Y path. Block 433 determines whether the first AZO is in the group of octets 24 through 47. If it is, block 433 transfers control to block 435 via the Y path. Block 435 stores the contents of octet number 48 into the first all zero octet. Next, each AZO of the group 24 through 47 has the address of the previous AZO stored in it. Block 435 then transfers control to block 429, which operates as mentioned above.

If the first AZO was not in the group of 24 through 47, it must have been in the group of octets 1 through 23. Therefore, block 433 transfers control to block 437 via the N path. Block 437 stores the contents of octet number 24 in the first AZO. Next, each AZO has its address stored in the previous all zero octet within the group of octets 1 through 23. Block 437 then transfers control to block 435, which operates as indicated above.

Figure 4C:
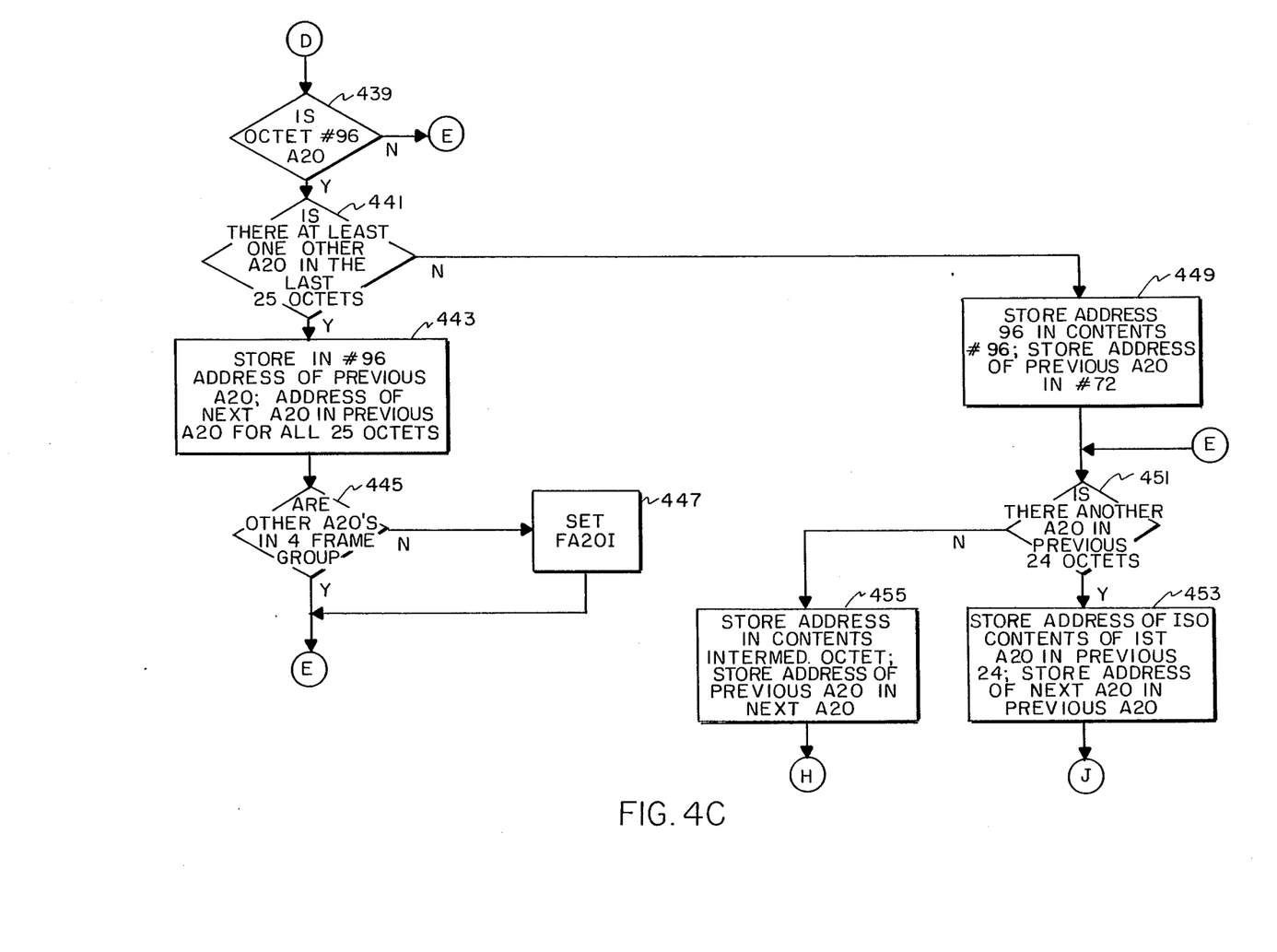

If block 419 determine that a zero octet existed in either octet number 72 or 96, control is transferred from block 419 to block 439 via the N path. Block 439 determines whether octet number 96 is an all zero octet. If it is, block 439 transfers control to block 441 via the Y path. Block 441 determines whether there is at least one other all zero octet contained in the last 25 octets. If there is, block 441 transfers control to block 443 via the Y path. Block 443 stores the address of the previous AZO in octet number 96. In addition, the address of the next AZO is stored in the previous AZO for each of the last 25 octets. Block 443 then transfers control to block 445. Block 445 determines whether there are other all zero octets in the 4 frame group. If there are no other AZOs, block 445 transfers control to block 447 via the N path. Block 447 sets the FAZOI (First All Zero Octet Indicator) equal to 1. The first all zero octet indicator is PCM bit 0 of the first all zero octet. Then block 447 transfers control to block 451. If there were other AZOs in the 4 frame group, control is transferred from block 445 to block 451 via the Y path.

If there was not another AZO in the last 25 octets, block 441 transfers control to block 449 via the N path. Block 449 stores the address of octet number 96 into the contents of octet number 96. In addition, the address of the previous AZO is stored in octet number 72. Block 449 then transfers control to block 451.

If octet number 96 was not an all zero octet, block 439 transfers control to block 451 via the N path. Block 451 determines whether there is another AZO in the previous 24 octets. If this question is answered in the affirmative, block 451 transfers control to block 453 via the Y path. Block 453 stores the address of an intermediate storage octet into the contents of the first all zero octet in the previous 24 octets. An intermediate storage octet is octet 24, 48 or 72. In addition, the address of the next AZO is stored in the previous AZO. Block 453 then transfers control to block 469. Block 469 determines whether the FAZOI was set to 1. If it was, block 469 transfers control to block 471 via the Y path. If the first all zero octet indicator was not set to 1, block 469 transfers control to block 459 via the N path.

Figure 4D:
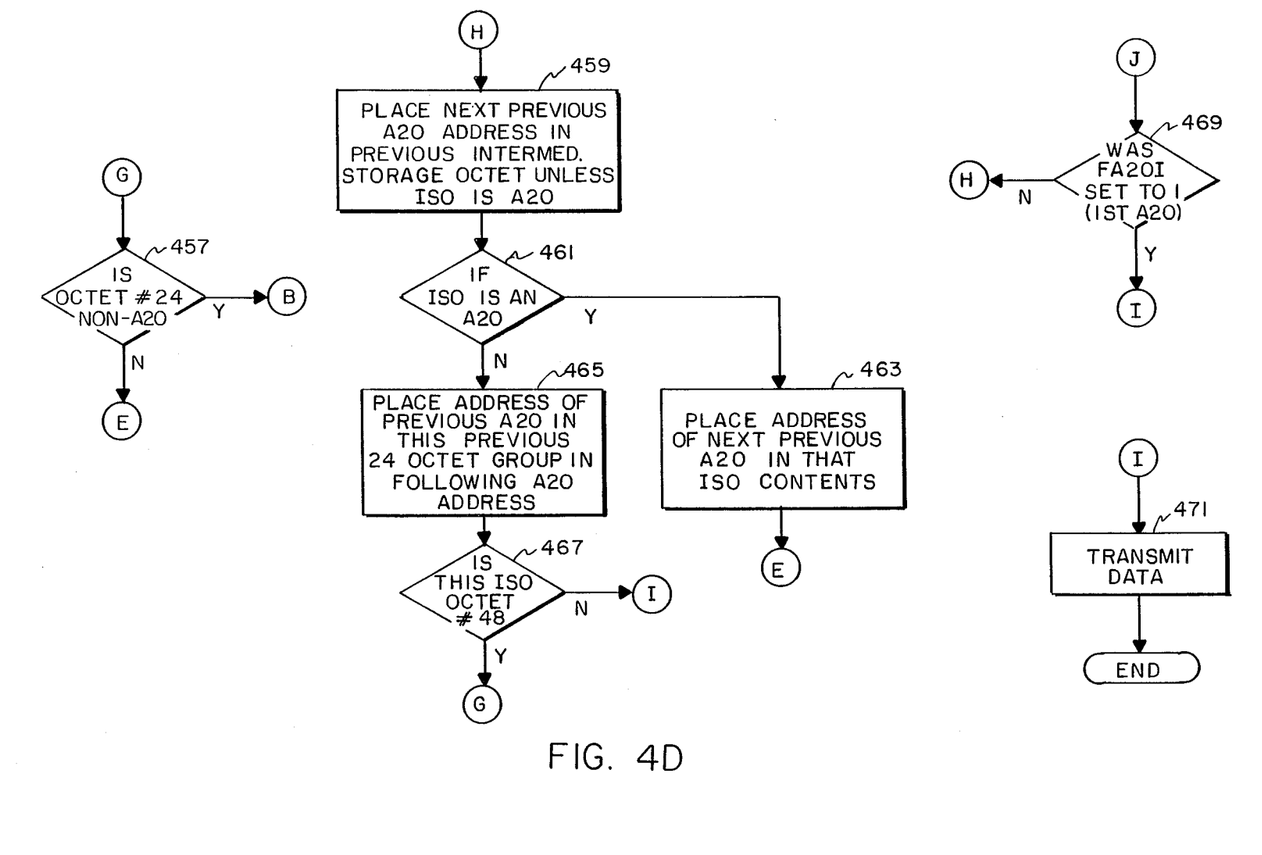

If there were no other AZOs in the previous 24 octets, block 451 transfers control to block 455 via the N path. Block 455 stores the address of the intermediate storage octet (ISO) into the contents of the ISO. In addition, the address of the previous AZO is stored in the next AZO for each of the octets. Block 455 then transfers control to block 459.

Block 459 places the next previous all zero octet address into the previous ISO. Block 459 then transfers control to block 461. Block 461 determines whether the intermediate storage octet is an all zero octet. If it is, control is transferred to block 463 via the Y path. Block 463 places the address of the next previous AZO into the contents of the ISO. Control is then transferred to block 451. If the ISO was not an all zero octet, block 461 transfers control to block 465 via the N path. Block 465 places the address of the previous all zero octet in the previous group of 24 octets at the next AZO address. Then, block 467 determines whether this ISO is octet number 48. If it is not, block 467 transfers control to block 471 via the N path. If it is, block 467 transfers control to block 457 via the Y path.

If block 457 determines that octet number 24 is an AZO, it transfers control to block 451 via the N path.

If block 425 determined that octet number 48 was an all zero octet, control is transferred to block 459 via the N path. Block 459 operates as described above.

Lastly, block 471 transmits the data frame and ends the process.

This method may be implemented via firmware contained in a digital signal processor. A Fujitsu digital signal processor part number MB-8764-DSP may be employed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a data transmission system having first and second digital switching systems connected via T-carrier line facilities for the bidirectional transmission of data, each said switching system including a method for Zero Byte Time Slot Interchange (ZBTSI), said ZBTSI method comprising the steps of:
    first determining whether there is a single all zero octet contained in a plurality of frames of said data, said all zero octet being an octet containing 8-bits of zeros;
    first storing an address representing said all zero octet in a predetermined location within said data and storing a contents of said predetermined location in said single all zero octet, said step of first storing being performed in response to a detection of said single all zero octet;
    second determining whether there are multiple all zero octets in said plurality of frames of data, said step of second determining being performed in response to an absence of said detection of said one all zero octet;
    third determining whether a certain intermediate storage octet is an all zero octet, said step of third determining being performed in response to a detection of multiple all zero octets;
    second storing a contents of said intermediate storage octet into a first all zero octet, said step of second storing being performed in response to a lack of detection of said certain intermediate storage octets being all zero octets;
    first chaining each of said all zero octets to said next all zero octet via insertion of an address representing a location of a next all zero octet into a contents said all zero octet, said step of first chaining being performed in response to said step of second storing;
    first iterating said steps of second storing and first chaining for each of said plurality of frames of data;
    fourth determining whether any of said intermediate storage octets are all zero octets, said fourth determining being performed in response to a detection of an intermediate storage octet being an all zero octet;
    third storing a contents of an intermediate storage octet into a next previous intermediate storage octet, said step of third storing being performed in response to said step of fourth determining;
    second chaining said each of said all zero octets to said a next all zero octet and said intermediate storage octet via insertion of an address representing a location of a next all zero octet into a contents of said all zero octet, said step of second chaining being performed in response to said step of third storing; and
    second iterating said steps of third storing and second chaining.

2. A ZBTSI method as claimed in claim 1, said step of first determining including the step of fifth determining whether said single all zero octet is contained in a first frame of said plurality.

3. A ZBTSI method as claimed in claim 2, said step of fifth determining further including the steps of:
    fourth storing a contents of octet numbers 24, 48, 72 and 96 into a location of said all zero octet, octet number 24, octet number 48 and octet number 72, respectively; and
    fifth storing an address of said all zero octet into said octet number 96.

4. A ZBTSI method as claimed in claim 3, said step of first determining further including the step of sixth determining whether said single all zero octet is contained in a second frame of said plurality.

5. A ZBTSI method as claimed in claim 4, said step of six determining further including the step of sixth storing: a contents of said octet number 48 into said all zero octet; the contents of octet number 72 into octet number 48; the contents of octet number 96 into octet number 48; and the address of said all zero octet into octet number 96.

6. A ZBTSI method as claimed in claim 5, said step of first determining further including the step of seventh determining whether said single all zero octet is contained in said third frame of said plurality.

7. A ZBTSI method as claimed in claim 6, said step of seventh storing: a contents of octet number 72 into said all zero octet; a contents of octet 96 into said octet number 72; and an address of said all zero octet into said octet number 96, said step of seven storing being performed in response to a detection of said single all zero octet in said third frame.

8. A ZBTSI method as claimed in claim 7, said step of seventh determining further including the step of eighth storing an address of said all zero octet into said octet number 96 and a contents of said octet number 96 into said all zero octet.

9. A ZBTSI method as claimed in claim 8, said step of third determining including the step of eighth determining whether said first all zero octet is contained within the group of octet numbers 72 through 96.

10. A ZBTSI method as claimed in claim 9, said step of second storing further including the steps of:

ninth storing a contents of octet number 96 into said first all zero octet;

tenth storing an address of a previous all zero octet into a contents of a next all zero octet; and eleventh storing an address of a last all zero octet into a contents of said octet number 96.

11. A ZBTSI method as claimed in claim 10, said step of third determining further including the step of ninth determining whether a particular intermediate storage octet is a non-all zero octet.

12. A ZBTSI method as claimed in claim 11, said step of third determining further including the step of tenth determining whether said first all zero octet is contained within the group of octet numbers 48 through 71.

13. A ZBTSI method as claimed in claim 12, said step of second storing further including the steps of:

twelfth storing a contents of octet number 72 into said first all zero octet;

thirteenth storing said address of said previous all zero octet into said contents of said next all zero octet;

fourteenth storing said contents of octet number 96 into said contents of octet number 72; and performing said steps of ninth, tenth and eleventh storing.

14. A ZBTSI method as claimed in claim 13, said step of third determining further including the step of eleventh determining whether said first all zero octet is contained in the group of octet numbers 24 through 47.

15. A ZBTSI method as claimed in claim 14, said step of eleventh determining including the steps of:

fifteenth storing a contents of a predetermined intermediate storage octet into a contents of said first all zero octet;

sixteenth storing an address of said previous all zero octet into a contents of a next all zero octet; and second performing said steps of twelfth, thirteenth and fourteenth storing and first performing.

16. A ZBTSI method as claimed in claim 15, said step of eleventh determining further including the steps of:

seventeenth storing a contents of a predetermined intermediate storage octet into said contents of said first all zero octet;

eighteenth storing said address of said previous all zero octet into said contents of said next all zero octet; and third performing said steps of fifteenth and sixteenth storing and second performing.

17. A ZBTSI method as claimed in claim 16, said step of fourth determining including the step of twelfth determining whether there is at least one other all zero octet contained within a last twenty five octets of said data.

18. A ZBTSI method as claimed in claim 17, said step of twelfth determining including the steps of:

ninth storing said address of said previous all zero octet into a contents of said octet number 96; and twentieth storing said address of said previous all zero octet into a contents of said next all zero octet, said steps of nineteenth and twentieth storing being being performed in response to a detection of at least one other all zero octet contained within a last 25 octets of said data.

19. A ZBTSI method as claimed in claim 18, said step of twelfth determining further including the steps of:

twenty-first storing an address representing ninety-six into a contents of octet number 96; and twenty-second storing an address of said previous all zero octet into a predetermined intermediate storage octet.

20. A ZBTSI method as claimed in claim 19, wherein there is further included the steps of:

thirteenth determining whether there are other all zero octets within said plurality of frames of data; and setting a first all zero octet indicator within a contents of said first all zero octet, said step of setting being performed in response to said detection of no other all zero octets being contained within said plurality of frames of data.

21. A ZBTSI method as claimed in claim 20, wherein there is further included the step of fourteenth determining whether there are other all zero octets contained within a previous 24 octets.

22. A ZBTSI method as claimed in claim 21, said step of fourteenth determining including the steps of twenty-third storing an address of said intermediate storage octet into a first all zero octet contained within said previous 24 octets; and twenty-fourth storing an address of a next all zero octet into a contents of said previous all zero octet.

23. A ZBTSI method as claimed in claim 22, said step of fourteenth determining further including the steps of:

twenty-fifth storing an address representing said intermediate storage octet into a contents of said intermediate storage octet; and twenty-sixth storing an address of a previous all zero octet into a contents of said next all zero octet.

24. A ZBTSI method as claimed in claim 23, wherein there is further included the step of twenty-seventh storing an address of a next previous all zero octet into said previous intermediate storage octet.

25. A ZBTSI method as claimed in claim 24, said step of fourth determining including the step of twenty-eighth storing an address of a next previous all zero octet into a contents of said intermediate storage octet, said step of twenty-eighth storing being performed in response to lack of detection of said intermediate storage octet being an all zero octet.

26. A ZBTSI method as claimed in claim 25, said step of fourth determining further including the step of twenty-ninth storing an address of said previous all zero octet into an octet contained in the previous 24 octets.

27. A ZBTSI method as claimed in claim 26, said step of fourth determining further including the steps of:

fifteenth determining whether said intermediate storage octet is octet number 48; and sixteenth determining whether said octet number 24 is a non-all zero octet.

28. A ZBTSI method as claimed in claim 27, said step of sixteenth determining further including the step of fourth performing said step of fourteenth determining in response to a lack of detection of said octet number 24 being a non-all zero octet.

29. A ZBTSI method as claimed in claim 28, said step of sixteenth determining further including the step of fifth performing said step of eleventh determining, said step of fifth performing being performed in response to a detection of said octet number 24 being a non-all zero octet.

30. A ZBTSI method as claimed in claim 29, wherein there is further included the step of transmitting said plurality of frames of said data.

* * * * *